(12) United States Patent
Zhou

(10) Patent No.: US 8,198,359 B2
(45) Date of Patent: Jun. 12, 2012

(54) MULTI-FUNCTIONAL NANOCOMPOSITE ADDITIVE COMPOSITIONS AND METHODS FOR MAKING AND USING SAME

(75) Inventor: Ninglin Zhou, Nanjing (CN)

(73) Assignee: Ninglin Zhou, Nanjing, Jiangsu (CN)

( * ) Notice: Subject to any disclaimer, the term of this patent is extended or adjusted under 35 U.S.C. 154(b) by 371 days.

(21) Appl. No.: 12/500,122

(22) Filed: Jul. 9, 2009

(65) Prior Publication Data

US 2011/0009549 A1 Jan. 13, 2011

(51) Int. Cl.
*C08L 39/00* (2006.01)
(52) U.S. Cl. ........... 524/556; 106/14.42; 106/14.44; 106/486

(58) Field of Classification Search ........... 524/556; 106/14.42, 14.44, 486
See application file for complete search history.

(56) References Cited

U.S. PATENT DOCUMENTS

2009/0163656 A1* 6/2009 DeLuca et al. ........ 524/837
* cited by examiner

*Primary Examiner* — Edward Cain
(74) *Attorney, Agent, or Firm* — Limin Wen

(57) ABSTRACT

The present invention relates to a novel multi-functional nanocomposite additive made from rare earth element complex modified organic clay which is called MFNA and methods for making and using the same, particularly in applications of coating manufacture industry. Such MFNA-modified coatings have desired features and improved physical and mechanical properties comparing the current available coatings.

6 Claims, 4 Drawing Sheets

MULTI-FUNCTIONAL NANOCOMPOSITE ADDITIVE COMPOSITIONS AND METHODS FOR MAKING AND USING SAME

FIELD OF THE INVENTION

This invention relates generally to a novel multi-functional nanocomposite additive made from rare earth element complex modified organic clay which is called Multi-Functional Nanocomposite Additive ("MFNA") and methods for making and using the same, particularly in applications of coating, sealants, caulks, adhesives, plastics additives, and the like.

BACKGROUND OF THE INVENTION

There are great demands for durable coating globally, for example, the coating applied outside walls of all kind of buildings. Such coating requires or prefers properties in terms of increased lifetime (super durable usage), thermal insulation, photocatalysis (photostable property or UV-resistance), gloss retention, anti-pollution, anti-bacteria/mold ability, fancy decorative feature, and others.

It is well known that UV from the sun is harmful to coatings on the outside walls of the building, which usually leads to photodegradation and consequently reduces the lifetime of such coatings. In the past, methods of combining durable latex emulsions with UV-absorbing agents were adopted to extend the lifetime of coatings. Normally, most coatings used on the outside walls of the building are relatively good in durability and are made from acrylics emulsion, silicone emulsion, or combination of the above two emulsions as acrylate-silicone emulsion, and fluorocarbon coatings. There are some advantages of the coatings made from acrylics emulsion such as relatively good photostability, washing durability, resistance to acid/alkaline, and resistance to erosion, however, such coatings have only about five years lifetime and their resistance to washing is not good enough, so it had been easier to be damaged or eroded if the coating was exposed outside the building long enough. Due to the expensive cost and higher solidified temperature, the applications of the coatings made from silicone emulsion are practically limited. Among all the aforementioned coatings, coatings made from acrylate-silicone emulsion are better than coatings made from acrylics emulsion in term of lifetime but are not comparable to fluorocarbon coatings. As the current ideal and the most durable coating in the market, fluorocarbon coating had limited applications and development because of its much higher price (3-5 fold higher) than other coatings.

In addition, the majority components of latex emulsions are a lot of organics and polymers, which are the "food" or nutrition for microorganism. Thus, there are all sorts of issues when applying such coatings to the walls such as adding preservatives before applying the coating and being damaged by surrounding microorganism. As the results, the coating would have less waterproof and less adhesive capability or form black scars or dots that influence the beauty and completeness of the coating. To avoid such issues, anti-bacteria and/or anti-mold agents or antiseptic agents are normally added into such coatings but these conventional anti-bacteria/mold agents are toxic and dangerous to the environment, which function would not last longer due to limited amount used in this addition.

Since all the current available coatings have different kinds of disadvantages mentioned above, there is a need to develop a new way or material or additive to improve physical and/or mechanical property of such coatings or similar materials used in many different situations. This invention describes compositions of a novel additive and methods to make the same with numerous potential applications, including but not limited to, coating, sealants, caulks, adhesives, plastics additives, and the like.

SUMMARY OF THE INVENTION

The present invention relates generally to a novel multi-functional nanocomposite additive made from rare earth complex modified organic clay which is called Multi-Functional Nanocomposite Additive ("MFNA") and methods for making and using the same, particularly in applications of coating, sealants, caulks, adhesives, plastics additives, and the like.

Such MFNA can be used in every situation or application wherever it can improve the physical or mechanical propertied of the material it involved with or added in. Most particularly, Coatings added with MFNA can covert ultraviolet light into visible light or infrared light, which could increase the temperature of the coatings. Such MFNA could also prolong usage lifetime and improve durability of coatings. In addition, since the invented MFNA-rare earth element complex has proved to have antiseptic function, the MFNA not only can be used to replace anti-UV absorbing agents but also can be used to replace antiseptic agents. Moreover, adding MFNA can simplify the coating production process and reduce the cost of coating manufacture. In addition, MFNA is an excellent filler which can improve the strength and flexibility of the coating modified with MFNA. The photodegradation rate can be modulated precisely by controlling the added amount of MFNA. Under certain condition, MFNA can be homogeneously dispersed in polymer emulsion. Because of the barrier/isolation effect from MFNA in the coating and the warming effect of converting UV light into visible light or infrared light from MFNA, using such MFNA-modified coatings will improve the temperature control within the buildings and then will maximally reduce the running time of air conditioning facilities, resulting in unexpected energy-saving benefit.

Within this invention, except the compositions of the MFNA described below, there are also disclosed methods to make the MFNA and its related coating products as examples.

In summary, the present invention provides a novel additive with huge potential applications in a lot of situations, which will improve the physical and mechanical properties of many useful materials such as coating. The invented additive also simplified the production process and reduced the cost for coating manufacture. It also solved some persistent problems of current coatings without compromising their good features.

DETAILED DESCRIPTION OF THE PREFERRED EMBODIMENTS

Figure 1:
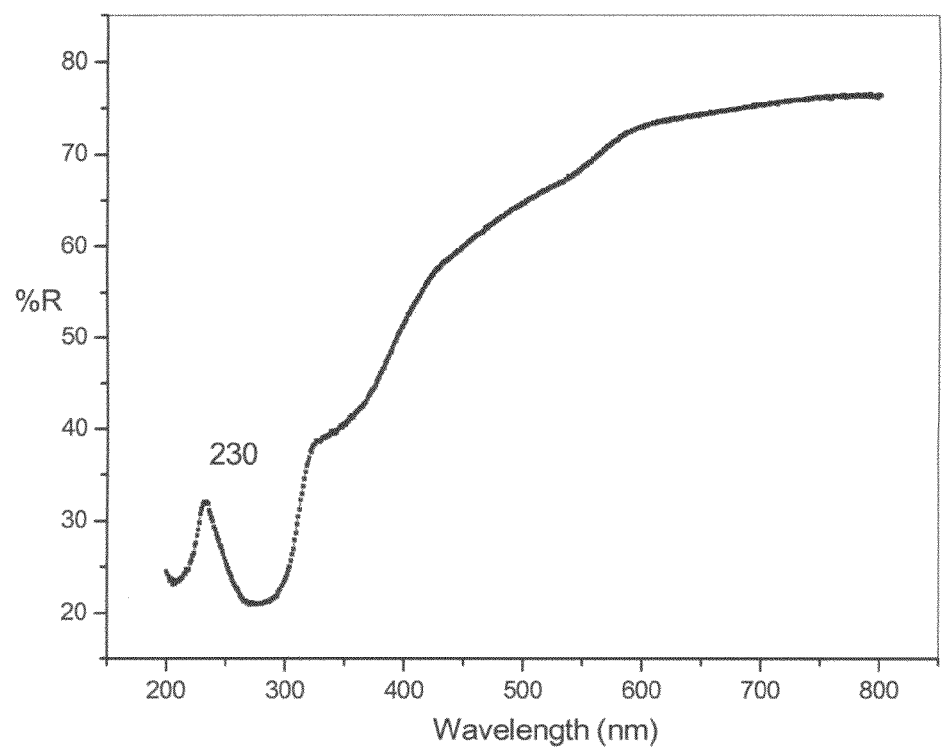
FIG. 1(a) presents Ultraviolet reflectance spectra of Multi-Functional Nanocomposite Additive ("MFNA").
FIG. 1(b) presents excitation spectra of Multi-Functional Nanocomposite Additive ("MFNA").
Figure 1:
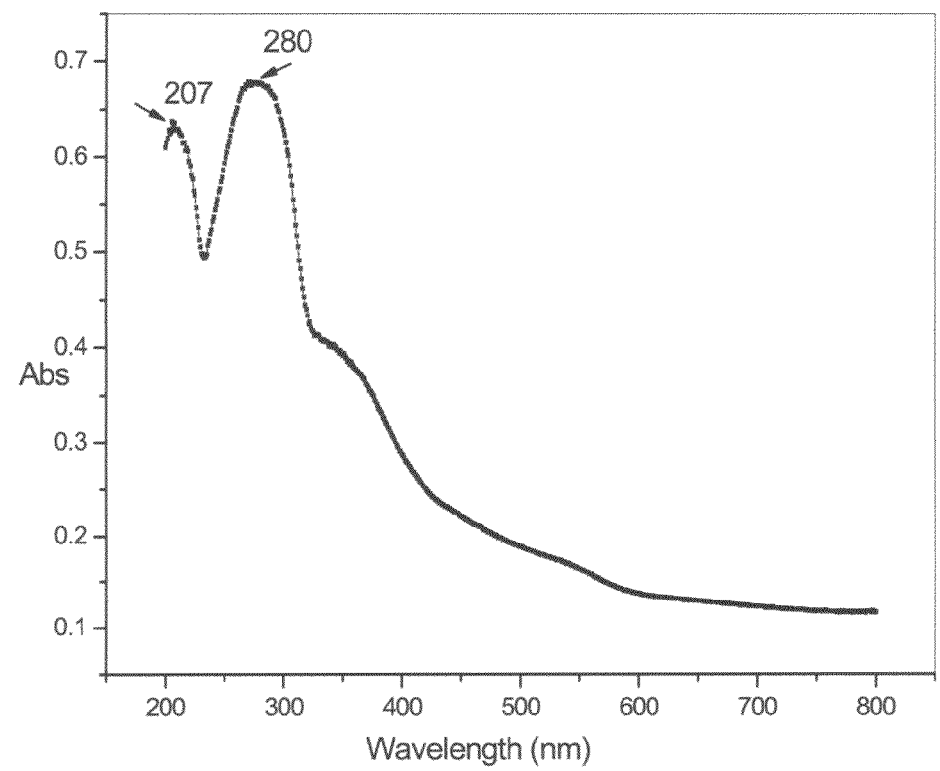

The present invention disclosed a novel Multi-Functional Nanocomposite Additive ("MFNA"), methods of process to prepare this kind of additive, specially showed that such MFNA is made from rare earth complex modified organic clay and related coating productions with this MFNA.

Nanocomposites are compositions in which at least one of its constituents has one or more dimensions such as length, width or thickness, in the nanometer size range. The term "nanocomposite", as used herein, denotes the state of matter wherein polymer molecules exist among at least partially exfoliated clay layers.

Clay minerals are layer-structured materials and are formed by the assemble of tetrahedral and octahedral sheets. These layers are not electrostatically neutral but rather are negatively charged; this results from the isomorphous substitution of $Al^{3+}$ in the octahedral sheet by $Mg^{2+}$ and $Fe^{2+}$ and the substitution of $Si^{4+}$ in the tetrahedral sheet by $Al^{3+}$. The negative charge is balanced by interlayer cations (usually $Mg^{2+}$, $Na^+$, $Ca^{2+}$, etc.). Because of their lower cost compared to other fillers, clay minerals have been used as fillers to modify physical and mechanical properties of polymers, such as conductivity, optical properties, permeation, and stability.

One way of improving polymer properties is by adding a clay material to polymers to form composite materials. However, incorporating clays into polymers may not provide a desirable improvement in the physical properties, particularly mechanical properties, of the polymer. This may be due, for example, to the lack of affinity between the clay and the polymer at the interface, or the boundary, between the clay and polymer within the material. In this connection, affinity between the clay and the polymer may improve the physical properties of the resulting nanocomposite by allowing the clay material to uniformly disperse throughout the polymer. The relatively large surface area of the clay, if uniformly dispersed, may provide more interfaces between the clay and polymer, and may subsequently improve the physical properties, by reducing the mobility of the polymer chains at these interfaces. By contrast, a lack of affinity between the clay and polymer may adversely affect the strength of the composition by having pockets of clay concentrated, rather than uniformly dispersed, throughout the polymer. Affinity between clays and polymers is related to the fact that clays, by nature, are generally hydrophillic whereas polymers, such as the polymers used in the aforementioned applications, are generally hydrophobic. In order to effectively improve the physical and/or mechanical properties, the clay is typically uniformly dispersed throughout the polymer to promote more interfaces between the clay and polymer and enhance the affinity of the clay to the polymer at these interfaces. The degree of dispersion of the reinforcement is critical for both modulus and strength development, in regard to the generation of aspect ratio and, in the latter case, for the elimination of stress concentrations. Nanoscale layered silicates, like their microscale counterparts, can be treated with agents that promote dispersion during normal mixing operations, while possibly also contributing to improved bonding to the matrix. In the case of smectic silicate nanocomposites, the dispersing agent is a surfactant coating pre-applied to the gallery walls. The mechanism for this treatment lies in the natural inorganic cationic counterions adsorbed to the inner surfaces of the clay galleries to balance the negative charges resulting from isomorphic substitution of lower valence atoms in the clay lattice. These hydrated cations can be exchanged for functionalized cations that allow tailoring of the naturally high energy surface with ionic surfactants to enhance polymer intercalation, layer exfoliation, and effective interfacial bonding to the polymer matrix.

Rare earth elements have been used in light conversion device such as TV and light emitting devices (LEDs) for many years. It has been shown that rare earth can convert ultraviolet (UV) light into visible light and infrared light, or convert visible light/infrared light into UV light. Such conversion can not only eliminate UV which is harmful to coatings, but also use sunlight more effectively to heat the building wherever coating covers. As a result, it can prolong the lifetime of coatings and lower the energy cost of climate control.

Quaternary ammonium salts or quaternary ammonium compounds are salts of quaternary ammonium cations with an anion. They are commonly used as disinfectants, surfactants, fabric softeners, and as antistatic agents. The mechanism of their bactericidal/microbicidal action is thought to be disruption of intermolecular interactions. This disruption can cause dissociation of cellular membrane bi-layers, which compromises cellular permeability controls and induces leakage of cellular contents.

The present invention disclosed a novel additive ("MFNA"), which is composite materials and was made from a complex of Europium of nitrate salt or hydrochloride salt mixed with Lanthanum, Samarium, Gadolinium and Cerium of nitrate salt or hydrochloride salt, aromatic carboxylic acids ligand, and single or double quaternary ammonium salt as organic ligand, combining with clay by intercalation reaction. The components formulation of such MFNA as below:

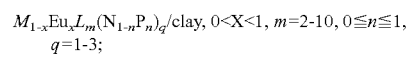
$M_{1-x}Eu_xL_m(N_{1-n}P_n)_q$/clay, $0 < X < 1$, $m=2-10$, $0 \leq n \leq 1$, $q=1-3$;

M could be any one of Lanthanum, Samarium, Gadolinium and Cerium, or their two or three combinations with any ratio; L could be any one of aromatic carboxylic acids ligand such as $C_1$-$C_{18}$ alkyl benzoic acids, amino benzoic acids, o-hydroxyl benzoic acid, phthalic acid, cinnamic acid, and naphthoic acid, or their two or three combinations in any ratio; N could be single quaternary ammonium salt as surface active agent; P could be double quaternary ammonium salt as surface active agent; Clay is layered silicate.

The single quaternary ammonium salt as surface active agent used in this invention has a formulation of $R^1N^+R^2R^3R^4X$, $R^1$ is $CH_3$—; $R^2$ is $CH_3$ or —$CH_2CH_2OH$; $R^3$ is $CH_3$ or $C_2H_5$ or —$CH_2C_6H_5$; $R^4$ is alkyl chain such as dodecyl, hexadecyl, or octadecyl. X is Cl or Br.

The double quaternary ammonium salt as surface active agent used in this invention has a structure as below:

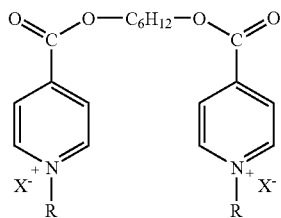

R is alkyl chain; X is Cl or Br or I.

The clay used in this invention is inorganic material with layered structure—layered silicate with cationic exchange capacity of 70~120 meq/100 g.

The coating with added MFNA consists of the following components (by weight):

| | |
|---|---|
| Polymer emulsion (about 50% of solid content) | 100 |
| Multi-Functional Nanocomposite Additive (MFNA) | 0.0005-5 |
| Solubilizer | 0.005-50 |

Polymer emulsions used in this invention include acrylics emulsion, silicone emulsion, polyvinyl acetate emulsion, silicone-acrylate copolymer emulsion, polyvinyl acetate-acrylics copolymer emulsion.

Solubilizers used in this invention include n-butanol, propylene glycol (or propane-1,2-diol), propylene glycol methyl ether or combinations of any two of the above solubilizers.

The general process of preparing the MFNA-added coating within this invention was to add MFNA (0.0005~5% w/w) into 100 parts of polymer emulsion (about 50% of solid content) to initiate monomer in-situ polymerization reaction.

One detailed MFNA-coating preparing process is described as below:

1. Mixed Europium of nitrate salt or hydrochloride salt with Lanthanum, Samarium, Gadolinium and Cerium of nitrate salt or hydrochloride salt, aromatic carboxylic acids, and single or double quaternary ammonium salt as organic ligand, according to molar ratio as 0.01-0.09/0.91-0.99/2-10/1-3 respectively. Then, let the mixture reacted at 20~200° C. for 3~6 hours to form rare earth complex;
2. Combined 0.5-100 part of above formed rare earth complex with 0.5-100 part of clay with cationic exchange capacity of 70-120 meq/100 g, dispersed in 20-2000 parts of solvent media under high speed agitation to form a homogeneous material. After 3~6 hours reaction between 20~200° C., the final product was subsequently washed, dried and crashed into powder, which was the multi-functional nanocomposite additive (MFNA).
3. Dispersed 0.0005-5 part of the above MFNA into 0.005-50 part of solubilizer with vigorous stirring, then further dispersed such dispersion into 100 parts of polymer emulsion (about 50% of solid content) with vigorous stirring for 3-6 hours, finally the MFNA-modified coating was produced and was ready for use thereafter.

The solubilizer used in step 3 of the above process could be n-Butanol, 1,2-propanediol, propylene glycol methyl ether, or mixture of any two of the above solubilizers.

Another detailed MFNA-coating preparing process is described as below:

1. Mixed Europium of nitrate salt or hydrochloride salt with Lanthanum, Samarium, Gadolinium and Cerium of nitrate salt or hydrochloride salt, aromatic carboxylic acids, and single or double quaternary ammonium salt as organic ligand, according to molar ratio as 0.01-0.09/0.91-0.99/2-10/1-3 respectively. Then, let the mixture reacted at 20~200° C. for 3~6 hours to form rare earth complex;
2. Combined 0.5-100 part of above formed rare earth complex with 0.5-100 part of clay with cationic exchange capacity of 70-120 meq/100 g, dispersed in 20-2000 parts of dissolvent media under high speed agitation to form a homogeneous material. After 3~4 hours reaction between 20~200° C., the final product was subsequently washed, dried and crashed into powder, which was the multi-functional nanocomposite additive (MFNA).
3. Dispersed 0.0005-5 part of the above MFNA into 100 parts of polymer emulsion (acrylics emulsion or silicone emulsion or polyvinyl acetate emulsion or silicone-acrylate copolymer emulsion or polyvinyl acetate-acrylics copolymer emulsion, about 50% of solid content) with vigorous stirring for 3~6 hours to have in-situ polymerization, finally the MFNA-modified coating was produced and was ready for use thereafter.

The advantages of the present invention are:
1. Coatings added with MFNA can convert harmful UV into visible light or infrared light that can increase the temperature of the coatings. Such MFNA-modified coatings have longer usage lifetime and better durability. Also, such MFNA-coatings can increase coating's gloss rentension value by 5-50% under 60° C. Moreover, since MFNA is an excellent filler, it can significantly improve the strength and toughness of the coating.
2. Because of MFNA's superior photocatalysis effect, the photodegradation rate of MFNA-modified coatings can be controlled depending on the species and amount of MFNA added.
3. Since the invented MFNA-rare earth complex contains quaternary ammonium salts that have proved to have broad antiseptic function, MFNA also have broad antiseptic function. Therefore, MFNA can be used to replace antiseptic agents (anti-bacteria and anti-fungus agents). Moreover, because of the modified organic clay with MFNA-rare earth complex has control release function, the mentioned antiseptic function could be kept the same long time as coating's lifetime. Furthermore, such antiseptic function from MFNA could simplify the coating production process and reduce the cost of coating manufacture, without adding any or several other anti-bacteria and/or anti-fungus/mold agents.

The following Table 1 showed the results of inhibition effects from MFNA on different bacteria and fungus by measuring the antiseptic area.

TABLE 1

| Antiseptic Effects of MFNA (0.05 g). | |
|---|---|
| Bacteria/Fungus | Diameter/mm |
| Escherichia coli (ATCC25922) | 30.00(13.50) |
| S. aureus Rosenbach (ATCC25923) | 27.00(13.50) |
| P. Aeruginosa (ATCC27853) | 26.00(13.50) |
| B. subtilis Cohn | 29.00(13.50) |
| MON Moniliformin | 31.50(13.50) |
| Mucor racemosus | 23.00(13.50) |

TABLE 1-continued

Antiseptic Effects of MFNA (0.05 g).

| Bacteria/Fungus | Diameter/mm |
|---|---|
| Penicillium | 24.00(13.50) |
| Aspergillus nidulans | 25.00(13.50) |
| P. chrysogenum Thom | 28.00(13.50) |
| Thermonasty rhizoid | 21.00(13.50) |
| Aspergillus flavus | 27.50(13.50) |
| Streptomycetaceae | 28.50(13.50) |
| C. albicanms (10231) | 22.00(13.50) |
| Fusarium sp. | 21.00(13.50) |
| Rhizopus oryzae | 20.00(13.50) |

Note:
The 13.50 mm is the diameter of the sample disk.

4. Under certain conditions, MFNA can be homogeneously dispersed in polymer emulsion. Because of the barrier/isolation effect of clay in the coating and the warming effect of converting UV into visible or infrared light from MFNA, the surface temperature of substrate painted with such MFNA-modified coatings could be lower or higher by about 10° C. than the surface temperature of substrate painted with non-MFNA-modified coatings depending on the coating painted. Such feature could improve temperature control within buildings, and then will maximally reduce the running time of air conditioning facilities which resulting in unexpected energy-saving benefit, particularly during the hot summertime and cold wintertime.

5. The process of producing MFNA-modified coatings invented in this invention could be finished by either solvent media intercalation polymerization method or in-situ intercalation polymerization, which significantly simplified the current synthesis process with short production period and easy to be industrialized.

6. The invented MFNA-modified coatings have very broad applications, including but not limited, various applications in civil, industry, military, construction, and others. For example, such MFNA-modified coatings can be applied on materials, including but not limited, concrete, metal substrate (steel, aluminum alloy, iron, etc.), wood, plastic such as agriculture film, and the likes.

The following are preferred embodiments of the present invention.

EXAMPLES

Example 1

Mixed $La_{0.9}Sm_{0.09}Eu_{0.01}Cl_3$, 1-Naphthoic acid, dodecyltrimethylammonium chloride and 4,4'-(1,6-hexamethylenedioxydicarbonyl)bis(1-dodecylpyridinium bromide) by molar ratio 1:4:1.8: 0.2, and then reacted in media for 6 hours at 20~40° C., obtained a novel complex. After all, 0.5 part the above complex and 0.6 part of organic clay which has a cationic exchange capacity of 80 meq/100 g were dispersed in 20 parts water under high speed agitation to form a homogeneous material. The homogeneous material was then reacted for 3~4 hours between 20~200° C. The final product was subsequently washed, dried and crashed into powder, which was the MFNA.

Disperse 0.0005 part of the above MFNA into 0.005 part n-Butanol under vigorous stirring. The above dispersion was added into 100 parts of acrylic emulsion and dispersed for 3 hours under vigorous stirring and was ready for use thereafter.

Example 2

Mixed $La_{0.7}Gd_{0.1}Eu_{0.2}NO_3$, Methyl benzoate, Cetyltrimethyl ammonium chloride and 4,4'-(1,6-hexamethylenedioxydicarbonyl)bis(1-hexadecylpyridinium chloride) by molar ratio 1:5:0.1:0.9, and then reacted in media for 4 hours at 40~60° C., obtained a novel complex. After all, 1 part the above complex and 10 part of organic clay which has a cationic exchange capacity of 90 meq/100 g were dispersed in 100 parts ethanol under high speed agitation to form a homogeneous material. The homogeneous material was then reacted for 3~5 hours between 60~70° C. The final product was subsequently washed, dried and crashed into powder, which was the MFNA.

Disperse 5 parts of the above MFNA into 50 parts 1,2-propanediol under vigorous stirring. The above dispersion was added into 100 parts 50% polyvinyl acetate emulsion and dispersed for 6 hours under vigorous stirring and was ready for use thereafter.

Example 3

Mixed $Ce_{0.4}Y_{0.2}Eu_{0.4}Cl_3$, β-naphthoic acid, Octadecyl trimethyl ammonium chloride and 4,4'-(1,6-hexamethylenedioxydicarbonyl)bis(1-octadecylpyridinium bromide) by molar ratio 1:8:0.4:1.6, and then reacted in media for 3 hours at 150~200° C., obtained a novel complex. After all, 6 parts the above complex and 7 parts organic clay which has a cationic exchange capacity of 80 meq/100 g were dispersed in 200 parts ethanol under high speed agitation to form a homogeneous material. The homogeneous material was then reacted for 4 hours between 80~100° C. The final product was subsequently washed, dried and crashed into powder, which was the MFNA.

Disperse 4 parts of the above MFNA into 40 parts 1-butanol/propylene glycol methyl ether under vigorous stirring. The above dispersion was added into 100 parts 50% silicone emulsion and dispersed for 4 hours under vigorous stirring and was ready for use thereafter.

Example 4

Mixed $La_{0.4}Y_{0.2}Eu_{0.4}Cl_3$, Cinnamic acid, dodecyltrimethylammonium chloride and 4,4'-(1,6-hexamethylenedioxydicarbonyl)bis(1-octadecylpyridinium bromide) by molar ratio 1:6:0.6:1.4, and then reacted in media for 4 hours at 60~80° C., obtained a novel complex. After all, 4 parts the above complex and 6 parts organic clay which has a cationic exchange capacity of 80 meq/100 g were dispersed in 300 parts ethanol under high speed agitation to form a homogeneous material. The homogeneous material was then reacted for 3~5 hours between 80~100° C. The final product was subsequently washed, dried and crashed into powder, which was the MFNA.

Disperse 3 parts the above MFNA into 10 parts 1-butanol/1,2-propanediol under vigorous stirring. The above dispersion was added into 100 parts 50% silicone/acrylic acid copolymer emulsion and dispersed for 4 hours under vigorous stirring and was ready for use thereafter.

Example 5

Mixed $Gd_{0.2}Y_{0.2}Eu_{0.6}C_3$, p-octadecyl benzoic acid, cetyltrimethyl ammonium bromide and 4,4'-(1,6-hexamethylenedioxydicarbonyl)bis(1-octadecylpyridinium bromide) by molar ratio 1:10:1.2:1.8, and then reacted in media for 3 hours at 100~150° C., obtained a novel complex. After all, 10 parts the above complex and 10 parts organic clay which has a cationic exchange capacity of 100 meq/100 g were dispersed in 400 parts ethanol under high speed agitation to form a homogeneous material. The homogeneous material was then reacted for 3 hours between 70~100° C. The final product was subsequently washed, dried and crashed into powder, which was the MFNA.

Disperse 2 parts the above MFNA into 10 parts propylene glycol methyl ether/1,2-propanediol under vigorous stirring. The above dispersion was added into 100 parts 50% polyvinyl acetate-acrylic copolymer emulsion and dispersed for 4 hours under vigorous stirring and was ready for use thereafter.

Example 6

Mixed $Gd_{0.6}Eu_{0.4}Cl_3$, p-cetyl benzoic acid, cetyltrimethyl ammonium bromide and 4,4'-(1,6-hexamethylenedioxydicarbonyl)bis(1-octadecylpyridinium bromide) by molar ratio 1:8:0.5:0.5, and then reacted in media for 5 hours at 80~100° C., obtained a novel complex. After all, 1 part the above complex and 30 parts organic clay which has a cationic exchange capacity of 70 meq/100 g were dispersed in 400 parts media under high speed agitation to form a homogeneous material. The homogeneous material was then reacted for 4 hours between 70~100° C. The final product was subsequently washed, dried and crashed into powder, which was the MFNA.

Disperse 1 part the above MFNA into 10 parts propylene glycol methyl ether/1,2-propanediol under vigorous stirring. The above dispersion was added into 100 parts 50% acrylic copolymer emulsion and dispersed for 3 hours under vigorous stirring and was ready for use thereafter.

Example 7

Mixed $La_{0.8}Eu_{0.2}Cl_3$, p-amino benzoic acid, cetyltrimethyl ammonium bromide and 4,4'-(1,6-hexamethylenedioxydicarbonyl)bis(1-octadecylpyridinium chloride) by molar ratio 1:6:1.2:0.8, and then reacted in media for 4 hours at 80~100° C., obtained a novel complex. After all, 3 parts the above complex and 10 parts organic clay which has a cationic exchange capacity of 120 meq/100 g were dispersed in 100 parts media under high speed agitation to form a homogeneous material. The homogeneous material was then reacted for 4 hours between 70~100° C. The final product was subsequently washed, dried and crashed into powder, which was the MFNA.

Disperse 0.1 part the above MFNA into 10 parts propylene glycol methyl ether/1,2-propanediol under vigorous stirring. The above dispersion was added into 100 parts 50% polyvinyl acetate-acrylic acid copolymer emulsion and dispersed for 3 hours under vigorous stirring and was ready for use thereafter.

Example 8

Mixed $Sm_{0.9}Eu_{0.1}(NO_3)_3$, p-pentyl benzoic acid and cetyltrimethyl ammonium bromide by molar ratio 1:7:1, and then reacted in media for 6 hours at 30~60° C., obtained a novel complex. After all, 5 parts the above complex and 5 parts organic clay which has a cationic exchange capacity of 80 meq/100 g were dispersed in 100 parts media under high speed agitation to form a homogeneous material. The homogeneous material was then reacted for 4 hours between 60~100° C. The final product was subsequently washed, dried and crashed into powder, which was the MFNA.

Disperse 0.2 part the above MFNA into 10 parts propylene glycol methyl ether/1,2-propanediol under vigorous stirring. The above dispersion was added into 100 parts 50% silicone emulsion and dispersed for 4 hours under vigorous stirring and was ready for use thereafter.

Example 9

Mixed $Y_{0.1}Eu_{0.9}Cl_3$, p-Phthalic acid and 4,4'-(1,6-hexamethylenedioxydicarbonyl)bis(1-octadecylpyridinium bromide) by molar ratio 1:2:1, and then reacted in media for 6 hours at 80~100° C., obtained a novel complex. After all, 3 parts the above complex and 3 parts organic clay which has a cationic exchange capacity of 80 meq/100 g were dispersed in 60 parts media under high speed agitation to form a homogeneous material. The homogeneous material was then reacted for 3~6 hours between 20~200° C. The final product was subsequently washed, dried and crashed into powder, which was the MFNA.

Disperse 0.3 part the above MFNA into 10 parts propylene glycol methyl ether/1,2-propanediol under vigorous stirring. The above dispersion was added into 100 parts 50% silicone acrylic acid copolymer emulsion and dispersed for 5 hours under vigorous stirring and was ready for use thereafter.

Example 10

Mixed $La_{0.7}Sm_{0.1}Eu_{0.2}Cl_3$, p-dodecyl benzoic acid, dimethyl hydroxyethyl cetyl ammonium bromide and 4,4'-(1,6-hexamethylenedioxydicarbonyl)bis(1-octadecylpyridinium bromide) by molar ratio 1:6:2.4:0.6, and then reacted in media for 5 hours at 20~200° C., obtained a novel complex. After all, 1 part the above complex and 100 parts organic clay which has a cationic exchange capacity of 90 meq/100 g were dispersed in 2000 parts media under high speed agitation to form a homogeneous material. The homogeneous material was then reacted for 6 hours between 70~100° C. The final product was subsequently washed, dried and crashed into powder, which was the MFNA.

Disperse 1.6 parts the above MFNA into 10 parts propylene glycol methyl ether/1,2-propanediol under vigorous stirring. The above dispersion was added into 100 parts 50% polyvinyl acetate-acrylic acid emulsion and dispersed for 6 hours under vigorous stirring and was ready for use thereafter.

Example 11

Mixed $La_{0.9}Sm_{0.09}Eu_{0.01}NO_3$, p-hexyl benzoic acid, p-amino benzoic acid, dimethyl hydroxyethyl cetyl ammonium bromide and 4,4'-(1,6-hexamethylenedioxydicarbonyl)bis(1-octadecylpyridinium bromide) by molar ratio 1:3:7:1.8:0.2, and then reacted in media for 6 hours at 30~60° C., obtained a novel complex. After all, 2 parts the above complex and 3 parts organic clay which has a cationic exchange capacity of 80 meq/100 g were dispersed in 30 parts media under high speed agitation to form a homogeneous material. The homogeneous material was then reacted for 5 hours between 70~100° C. The final product was subsequently washed, dried and crashed into powder, which was the MFNA.

Disperse 1 part the above MFNA into 10 parts propylene glycol ether/1,2-propanediol under vigorous stirring. The above dispersion was added into 100 parts 50% polyvinyl acetate-acrylic acid emulsion and dispersed for 3 hours under vigorous stirring and was ready for use thereafter.

Example 12

Mixed $La_{0.7}Sm_{0.29}Eu_{0.01}Cl_{31}$, p-dodecyl benzoic acid, dimethyl hydroxyethyl cetyl ammonium bromide and 4,4'-(1, 6-hexamethylenedioxydicarbonyl)bis(1-octadecylpyridinium bromide) by molar ratio 1:6:1.2:0.3, and then reacted in media for 5 hours at 20~200° C., obtained a novel complex. After all, 1 part the above complex and 0.5 part organic clay which has a cationic exchange capacity of 90 meq/100 g were dispersed in 10 parts media under high speed agitation to form a homogeneous material. The homogeneous material was then reacted for 6 hours between 70~100° C. The final product was subsequently washed, dried and crashed into powder, which was the MFNA.

Disperse 2 parts the above MFNA into 10 parts propylene glycol ether/1,2-propanediol under vigorous stirring. The above dispersion was added into 100 parts 50% polyvinyl acetate-acrylic acid emulsion and dispersed for 3 hours under vigorous stirring and was ready for use thereafter.

Example 13

Mixed $La_{0.7}Sm_{0.29}Eu_{0.01}Cl_3$, p-dodecyl benzoic acid, dimethyl ethyl cetyl ammonium bromide and 4,4'-(1,6-hexamethylenedioxydicarbonyl)bis(1-octadecylpyridinium iodide) by molar ratio 1:6:1.05:0.45, and then reacted in media for 5 hours at 20~200° C., obtained a novel complex. After all, 1 part the above complex and 3 parts organic clay which has a cationic exchange capacity of 90 meq/100 g were dispersed in 20 parts media under high speed agitation to form a homogeneous material. The homogeneous material was then reacted for 6 hours between 70~100° C. The final product was subsequently washed, dried and crashed into powder, which was the MFNA.

Disperse 0.0005 part of the above MFNA into 100 parts acrylic acid monomer (50% solid content), then in-situ polymerization and was ready for use thereafter.

Example 14

Mixed $Gd_{0.4}Y_{0.2}Eu_{0.4}Cl_3$, p-dodecyl benzoic acid, dimethyl benzyl cetyl ammonium chloride and 4,4'-(1,6-hexamethylenedioxydicarbonyl)bis(1-octadecylpyridinium bromide) by molar ratio 1:6:1.2:0.8, and then reacted in media for 5 hours at 20~200° C., obtained a novel complex. After all, 5 parts the above complex and 10 parts organic clay which has a cationic exchange capacity of 90 meq/100 g were dispersed in 100 parts media under high speed agitation to form a homogeneous material. The homogeneous material was then reacted for 3 hours between 60~80° C. The final product was subsequently washed, dried and crashed into powder, which was the MFNA.

Disperse 5 parts the above MFNA into 100 parts silicone monomer (50% solid content), then in-situ polymerization and was ready for use thereafter.

Example 15

Mixed $La_{0.7}Gd_{0.1}Eu_{0.2}NO_3$, p-dodecyl benzoic acid, methyl dihydroxyethyl dodecyl ammonium chloride and 4,4'-(1,6-hexamethylenedioxydicarbonyl)bis(1-hexadecylpyridinium iodide) by molar ratio 1:6:1:1, and then reacted in media for 6 hours at 20~200° C., obtained a novel complex. After all, 1 part the above complex and 3 parts organic clay which has a cationic exchange capacity of 90 meq/100 g were dispersed in 20 parts media under high speed agitation to form a homogeneous material. The homogeneous material was then reacted for 6 hours between 70~100° C. The final product was subsequently washed, dried and crashed into powder, which was the MFNA.

Add 0.005 part the above MFNA into 100 parts polyvinyl acetate monomer (50% solid content), then in-situ polymerization and was ready for use thereafter.

Example 16

Mixed $La_{0.49}Sm_{0.5}Eu_{0.01}NO_3$, p-dodecyl benzoic acid, dimethyl hydroxyethyl cetyl ammonium bromide and 4,4'-(1,6-hexamethylenedioxydicarbonyl)bis(1-octadecylpyridinium bromide) by molar ratio 1:6:1.2:1.8, and then reacted in media for 5 hours at 20~200° C., obtained a novel complex. After all, 1 part the above complex and 100 parts organic clay which has a cationic exchange capacity of 90 meq/100 g were dispersed in 2000 parts media under high speed agitation to form a homogeneous material. The homogeneous material was then reacted for 6 hours between 70~100° C. The final product was subsequently washed, dried and crashed into powder, which was the MFNA. Add 0.01 part the above MFNA into 100 parts silicone acrylic acid copolymer monomer (50% solid content), then in-situ polymerization and was ready for use thereafter.

Example 17

Mixed $La_{0.49}Sm_{0.5}Eu_{0.01}NO_3$, p-dodecyl benzoic acid, dimethyl hydroxyethyl cetyl ammonium bromide and 4,4'-(1,6-hexamethylenedioxydicarbonyl)bis(1-octadecylpyridinium bromide) by molar ratio 1:6:0.9:2.1, and then reacted in media for 5 hours at 20~200° C., obtained a novel complex. After all, 1 part the above complex and 100 parts organic clay which has a cationic exchange capacity of 90 meq/100 g were dispersed in 2000 parts media under high speed agitation to form a homogeneous material. The homogeneous material was then reacted for 6 hours between 70~100° C. The final product was subsequently washed, dried and crashed into powder, which was the MFNA.

Add 4 parts the above MFNA into 100 parts polyvinyl acetate-acrylic acid copolymer monomer (50% solid content), then in-situ polymerization and was ready for use thereafter.

Example 18

The implementation of this example is basically the same as the above-mentioned cases, but with the following change: the aromatic carboxylic acid is replaced by p-decyl benzoic acid.

Example 19

The implementation of this example is basically the same as the above-mentioned cases, but with the following change: the aromatic carboxylic acid is replaced by p-nonyl benzoic acid.

Example 20

The implementation of this example is basically the same as the above-mentioned cases, but with the following change: the aromatic carboxylic acid is replaced by p-heptyl benzoic acid.

Example 21

The implementation of this example is basically the same as the above-mentioned cases, but with the following change: the aromatic carboxylic acid is replaced by p-butyl benzoic acid.

Example 22

The implementation of this example is basically the same as the above-mentioned cases, but with the following change: the aromatic carboxylic acid is replaced by p-propyl benzoic acid.

Example 23

The implementation of this example is basically the same as the above-mentioned cases, but with the following change: the aromatic carboxylic acid is replaced by p-ethyl benzoic acid.

Example 24

The implementation of this example is basically the same as the above-mentioned cases, but with the following change: the aromatic carboxylic acid is replaced by o-hydroxyl benzoic acid.

Figure 2:
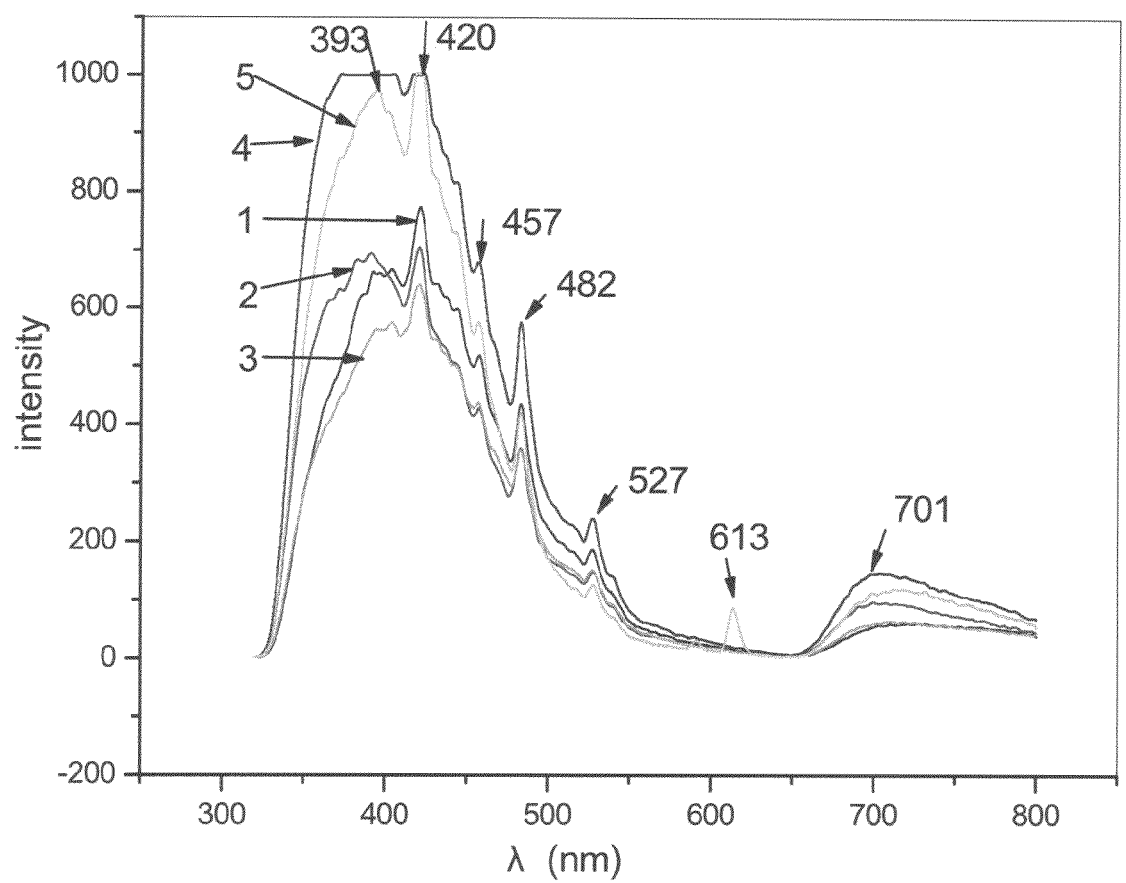
FIG. 2 presents an emission spectra of coatings with and without Multi-Functional Nanocomposite Additive ("MFNA") addition.
  1. Coating control;
  2. Coating+0.01% MFNA;
  3. Coating+0.02% MFNA;
  4. Coating+0.5% MFNA;
  5. MFNA control.
Figure 3:
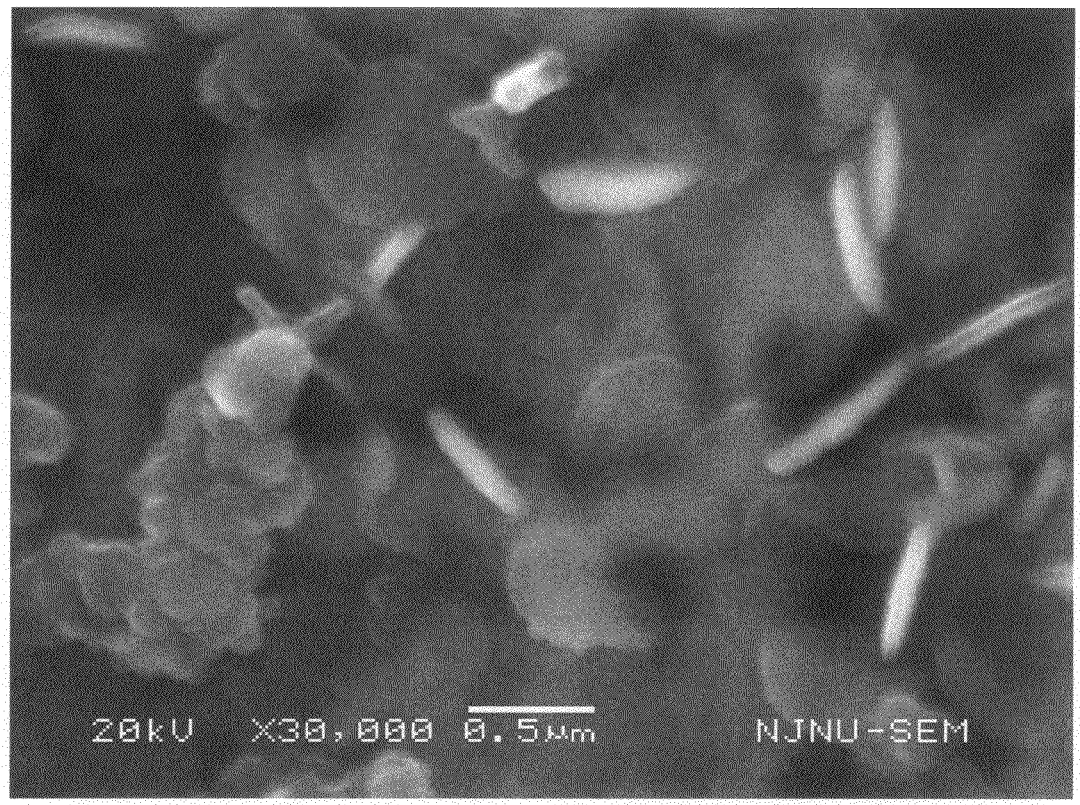
FIG. 3 presents a SEM view of Multi-Functional Nanocomposite Additive ("MFNA") dispersed in coating.
Figure 4:
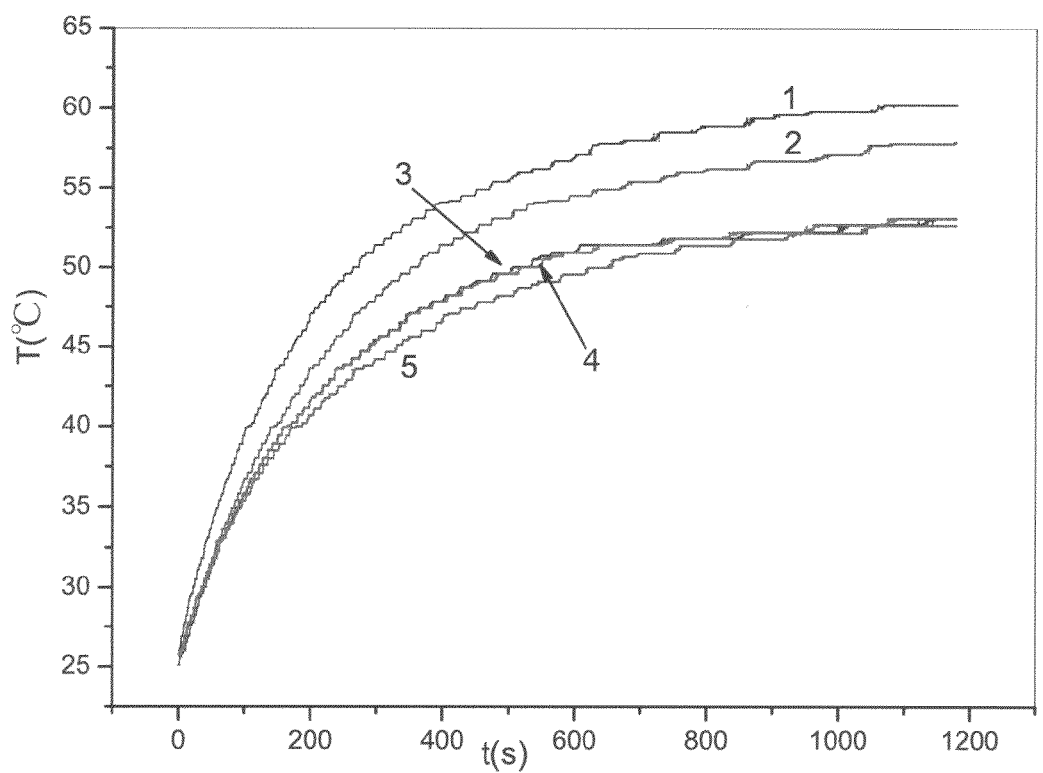
FIG. 4 presents a temperature-changing map of coatings with and without
Multi-Functional Nanocomposite Additive ("MFNA") addition.
1. Substrate without coating;
2. Substrate with acrylics emulsion;
3. Substrate with acrylics emulsion and 0.01% MFNA;
4. Substrate with acrylics emulsion and 0.02% MFNA;
5. Substrate with acrylics emulsion and 0. 1% MFNA.

All the above embodiments may also be understood well by referring to FIG. 1 to FIG. 4, which depict related physical and/or mechanical properties of MFNA or MFNA-modified coatings.

The key part of the process in making the intercalation nanocomposite complex is how to select and use the intercalation agent. By now, there is no report about similar invention on our Multi-Functional Nanocomposite Additive ("MFNA") and any usage of such MFNA modified montmorillonite in producing polymers.

The advantages of the present invention are manifested in very practical ways, with huge potential applications in many areas. Although Multi-Functional Nanocomposite Additive ("MFNA") and methods for making and using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A Multi-Functional Nanocomposite Additive ("MFNA") comprises composite materials and is made from a complex of Europium of nitrate salt or hydrochloride salt mixed with Lanthanum of nitrate salt or hydrochloride salt, or Samarium of nitrate salt or hydrochloride salt, or Gadolinium of nitrate salt or hydrochloride salt, or Cerium of nitrate salt or hydrochloride salt, aromatic carboxylic acids ligand, and single or double quaternary ammonium salt as organic ligand, combining with clay by intercalation reaction, wherein the components formulation of said MFNA as below:

$M_{1-x}Eu_xL_m(N_{1-n}P_n)_q$/clay, $0<X<1$, $m=2-10$, $0 \leq n \leq 1$, $q=1-3$;

M is selected from Lanthanum, Samarium, Gadolinium, and Cerium; L is any one of aromatic carboxylic acids ligand which is selected from $C_1$-$C_{18}$ alkyl benzoic acids, amino benzoic acids, o-hydroxyl benzoic acid, phthalic acid, cinnamic acid, and naphthoic acid or mixture of any two or three of the above ligands in any ratio; N is single quaternary ammonium salt as surface active agent; P is double quaternary ammonium salt as surface active agent; clay is layered Silicate.

2. The composition of claim 1, wherein said single quaternary ammonium salt as surface active agent used in this invention has a formulation of $R^1N^+R^2R^3R^4X$, $R^1$ is $CH_3$—; $R^2$ is $CH_3$ or —$CH_2CH_2OH$; $R^3$ is $CH_3$ or $C_2H_5$ or —$CH_2C_6H_5$; $R^4$ is alkyl chain selected from dodecyl, hexadecyl, or octadecyl; X is Cl or Br.

3. The composition of claim 1, wherein said double quaternary ammonium salt as surface active agent used in this invention has a structure as below:

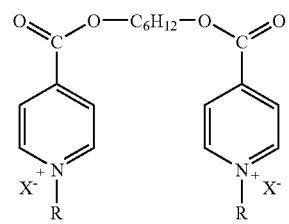

R is alkyl chain selected from dodecyl, hexadecyl, or octadecyl; X is Cl or Br or I.

4. The composition of claim 1, wherein said clay used in this invention is inorganic material with layered structure—layered Silicate with cationic exchange capacity of 70~120 meq/100 g.

5. The composition of claim 1, wherein the ratio of said single quaternary ammonium salt (N) to said double quaternary ammonium salt (P) in formula $M_{1-x}Eu_xL_m(N_{1-n}P_n)_q$/clay of claim 1 is 0-100% or 100-0%.

6. The Multi-Functional Nanocomposite Additive (MFNA) of claim 1 is added into a coating formulation which comprises the following components (by weight):

| | |
|---|---|
| Polymer emulsion (about 50% of solid content) | 100 |
| Multi-Functional Nanocomposite Additive (MFNA) | 0.0005-5 |
| Solubilizer | 0.005-50 | wherein said Polymer emulsion used in the above formulation is selected from acrylics emulsion, silicone emulsion, polyvinyl acetate emulsion, silicone-acrylate copolymer emulsion, polyvinyl acetate-acrylics copolymer emulsion; and wherein said Solubilizer used in this invention is selected from n-butanol, Propylene glycol (or propane-1,2-diol), propylene glycol methyl ether or combinations of any two of the above solubilizers; wherein said MFNA (0.0005-5% w/w) is added into 100 parts of polymer emulsion (about 50% of solid content) to initiate monomer in-situ polymerization reaction; wherein a method or process for adding said MFNA into said coating formulation comprises the following steps:

a) Mixing Europium of nitrate salt or hydrochloride salt with Lanthanum of nitrate salt or hydrochloride salt, or Samarium of nitrate salt or hydrochloride salt, or Gadolinium of nitrate salt or hydrochloride salt, or Cerium of nitrate salt or hydrochloride salt, aromatic carboxylic acids, and single or double quaternary ammonium salt as organic ligand, according to molar ratio as 0.01-0.09/0.91-0.99/2-10/1-3 respectively; then, let the mixture reacted at 20"-~200*C for 3~6 hours to form rare earth complex; and b) Combining 0.5-100 part of above formed rare earth complex with 0.5-100 part of clay with cationic exchange capacity of 70-120 meq/100 g, then dispersing in 20-2000 parts of dissolvent media under high speed agitation to form a homogeneous material; after 3-6 hours reaction between 20-200° C., the final product is subsequently washed, dried and crushed into powder, which is the multi-functional nanocomposite additive (MFNA); and c) Dispersing 0.0005-5 part of the above MFNA into 0.005-50 part of solubilizer with vigorous stirring, then further dispersing such dispersion into 100 parts of polymer emulsion (about 50% of solid content) with vigorous stirring for 3-6 hours, finally the MFNA-modified coating is produced and is ready for use thereafter; wherein the above solubilizer used in step c of the above process is selected from 1-Butanol, 1,2-propanediol, propylene glycol methyl ether, or mixture of any two of the above solubilizers;

wherein another method or process for adding said MFNA into said coating formulation comprises the following steps:

a) Mixing Europium of nitrate salt or hydrochloride salt with Lanthanum of nitrate salt or hydrochloride salt, or Samarium of nitrate salt or hydrochloride salt, or Gadolinium of nitrate salt or hydrochloride salt, or Cerium of nitrate salt or hydrochloride salt, aromatic carboxylic acids, and single or double quaternary ammonium salt as organic ligand, according to molar ratio as 0,01-0,09/0,91-0.99/2-10/1-3 respectively; then, let the mixture reacted at 20-200° C. for 3-6 hours to form rare earth complex; and b) Combining 0.5-100 part of above formed rare earth complex with 0.5-100 part of clay with cationic exchange capacity of 70-120 meq/100 g, then dispersing in 20-2000 parts of dissolvent media under high speed agitation to form a homogeneous material; after 3-6 hours reaction between 20~200° C., the final product is subsequently washed, dried and crushed into powder, which is the multi-functional nanocomposite additive (MFNA); and c) Dispersing 0,0005-5 part of the above MFNA into 100 parts of polymer emulsion (acrylics emulsion or Silicone emulsion or polyvinyl acetate emulsion or silicone-acrylate copolymer emulsion or polyvinyl acetate-acrylics copolymer emulsion, about 50% of solid content) with vigorous stirring for 3-6 hours to have in-situ polymerization, finally the MFNA-modified coating is produced and is ready for use thereafter.

* * * * *